3,758,322
RUTILE TiO₂ SLURRIES

George Leathwhite Roberts, Jr., Savannah, Ga., and John David Rowland, Amherst, Va., assignors to American Cyanamid Company, Stamford, Conn.
No Drawing. Filed July 21, 1971, Ser. No. 164,939
Int. Cl. C09c 1/36
U.S. Cl. 106—300                                            4 Claims

ABSTRACT OF THE DISCLOSURE

Pigment slurries of at least about 60% to 80% by weight solids content are obtained by flocculating a grit-free anhydrous pigment slurry of about 20% by weight solids, which after intermediate washing and dewatering is reslurried in the presence of a dispersant such as 2-amino-2-methyl-1-propanol. Such slurries, preferably of rutile pigment, are highly useful in the production of coated papers and water based paints.

---

This invention relates to titanium dioxide pigment slurries of high solids content. More particularly, it relates to rutile pigment slurries having a solids content of from 60–80 weight percent which high solids content pigment slurries are highly useful in the production of coated papers and water based paints.

BACKGROUND OF THE INVENTION

Titanium dioxide is at present the premier white pigment of commerce. It is generally produced by either hydrolyzing an aqueous solution of a titanium salt such as a sulfate and calcining the hydrolysate at 750–1000° C. or oxidizing a titanium halide, e.g. titanium tetrachloride, at elevated temperatures of 800° C. and higher, followed by cooling to a temperature below 600° C. The product resulting from the calcination or oxidation contains a substantial amount of oversized, gritty $TiO_2$ particles which are broken up by either wet or dry grinding. Drying, following wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An optimum means for dry grinding is a fluid energy mill in which the pigment particles are conveyed by a gaseous fluid, such as air or steam, into the outer portion of an inwardly spiralling vortex at high velocity and in a manner which will maintain the vortex at a high rotative speed and relatively low inward speed whereby the pigment aggregates may be fractured.

THE PRIOR ART

U.S. Pat. 3,536,510 describes high solids content anatase slurries in which dry milled anatase $TiO_2$ is dispersed in water using appropriate dispersants, preferably alkanolamines. German Pat. 1,908,611 relates to high solids content rutile $TiO_2$-water mixtures using finished rutile $TiO_2$ dispersed with sodium polyphosphates. This invention differs from the above prior art by the use of in-process material, e.g. grit-free defluocculated and non-hydrous oxide treated $TiO_2$ slurries as starting material for preparation of high solids content rutile slurries, using an appropriate dispersant.

SUMMARY OF THIS INVENTION

In accordance with this invention, there is provided a process for producing high solids content pigment slurries comprising the steps of: flocculating a grit-free slurry of about 20% solids by weight titanium dioxide pigment with a flocculating reagent; dewatering and washing said flocculated pigment; followed by a final dewatering to obtain high solids content cake; and, reslurrying said dewatered pigment by means of a dispersing agent whereby a pigment slurry of at least 60% solids content is obtained without the need of additional water.

DESCRIPTION OF INVENTION

The flocculating agents include magnesium sulfate, magnesium chloride, barium chloride, sulfuric acid, hydrochloric acid and acetic acid. It is preferred to use $MgSO_4 \cdot 7H_2O$. The flocculating agents are used in amounts ranging from 0.2% to about 1.0% by weight of the pigment solids in the slurry.

The dewatering of flocculated pigment obtained by the flocculation of in-process, grit-free, anhydrous-pigment slurry can be by any of a number of filtration methods, preferably vacuum. The most significant consideration is that the dewatering is continued until a filter cake of high solids, i.e. 60–80%, content is obtained.

It has been found that merely adding the dispersant to a high solids content filter cake with mechanical agitation yields a flowable slurry; e.g., adding 0.4% of 2-amino-2-methyl-1-propanol to a 72% solids filter cake provides for an ~72% solids rutile slurry which has a viscosity of about 400 cps. with a pH of 10.3.

The dispersants found useful include 2-amino-2-methyl-1-propanol, triethanolamine, sorbitol, mannitol, and water soluble salts, for example, sodium, of polymeric carboxylic acids, such as Tamol 731 and Tamol 850, sold by Rohm & Haas; Daxad 30, sold by W. R. Grace and Nopcosant K, sold by the Nopco Division of Diamond-Shamrock Corporation.

The dispersants are used in amounts ranging from 0.3% to 0.75% by weight based on the weight of the pigment solids of said filter cake.

The present invention provides a method of obtaining high solids content pigment slurries, preferably rutile pigment slurries, by using $TiO_2$ which is derived either from conventional hydrolysis or combustion processes. The exact technique which is used to prepare the crude $TiO_2$ pigment material does not constitute a part of the present invention and any of the conventional known techniques may be used. However, it is critical to the practice of the present invention that the crude $TiO_2$ pigment have associated therewith, either by formation in situ or subsequent addition to calcination or oxidation, a small amount of alumina, magnesia or zinc oxide as a color stabilizer.

Thus, one method of obtaining a crude $TiO_2$ pigment material for use in the present invention is by the digestion of titaniferous material such as ilmenite with a strong mineral acid such as sulfuric acid, whereby there is obtained a soluble titanium salt. The titanium salt is converted to a titanium dioxide composition by controlled hydrolysis, and the resultant hydrolysates are filtered, washed and calcined. Calcination yields a material which after further processing can serve in many conventional pigmentary applications.

For the purpose of the present invention, as stated above, it is useful that the $TiO_2$ material have associated therewith a small amount of color stabilizer. When the color stabilizer used is $Al_2O_3$ it can be incorporated into the material by addition of an aluminum salt or hydrous aluminum oxide to the filtered and washed hydrolysate prior to the calcination step.

Likewise, the $TiO_2$ pigment which is useful as a starting material in the present invention can be obtained by combustion of titaniferous salts such as titanium tetrachloride. Such combustion methods for obtaining $TiO_2$ pigments are well known and the choice of any particular technique is not an essential part of the present invention. It is a matter of choice whether the color stabilizer is incorporated into the $TiO_2$ starting material by formation in situ or by addition during the combustion of a titanium compound. It is most convenient to incorporate an aluminum-containing material by formation in situ whereby an aluminum salt such as aluminum chloride is mixed with the titanium tetrachloride and burned concurrently to form $TiO_2$-containing alumina.

Regardless of the means by which the pigment is obtained, it can be converted by the process of the present invention to a pigmentary slurry of high solids content. The important criteria is that the crude pigment be wet-ground and followed by a grit removal step, such as hydroclassification in a centrifuge or screening through a vibratory double-deck 325 mesh screen, to provide a grit-free slurry. By "grit-free" is meant that no particles in excess of 4 mcirons should be present. Wet-grinding can be done with any conventional means, e.g., ball mill, or disc mill.

The following examples are presented to further illustrate the invention.

Example 1

600 grams of rutile $TiO_2$ as a 20% by weight grift-free solid slurry were flocculated with 0.2–0.5% $MgSO_4 \cdot 7H_2O$ ($TiO_2$ basis). The flocculated slurry was dewatered on a Büchner funnel and washed 1:1 with hot (60° C.) water. The filter cake was then dewatered under vacuum for approximately 90 minutes to obtain a high solids content filter cake.

The filter cakes were found to have specific resistances in the range of 10–20,000 ohm-cm. The filter cakes were reslurried using 0.5% 2-amino-2-methyl-1-propanol (on a $TiO_2$ basis) with manual and/or mechanical agitation. The resultant slurries were 70% solids content and gave viscosities of from 100–400 cps. using the Brookfield Model LVF Viscometer at 60 r.p.m. with the No. 4 spindle and had pH's from 10.0–10.5. When evaluated in low PVC latex paint, the slurries showed properties similar to a dry-finished pigment. See Table I.

Example 2

A similar experiment was carried out on a pilot plant scale using a 10 ft.$^2$ rotary filter for dewatering. The grit-free deflocculated slurry of 20% solids by weight was flocculated with 0.3% $MgSO_4 \cdot 7H_2O$ on a $TiO_2$ basis and then pumped to the pick-up bowl of the pilot plant rotary filter. The level was kept low in the pick-up bowl and the filter was rotated at a slow speed in order to provide a long dewatering cycle and thereby obtain a high solids content filter cake. The resultant filter cake was reslurried using 0.5% 2-amino-2-methyl-1-propanol (on a $TiO_2$ basis) as dispersant which yielded a fluid slurry of 65% solids content with a pH of 10.4 and a Brookfield viscosity of 150 cps. A low PVC latex paint evaluation showed this slurry had optical properties essentially equal to a dry, finished pigment (Table I).

Example 3

In a plant scale test, the starting material (grit-free deflocculated lsurry of about 20% solids) was flocculated with 0.3% $MgSO_4 \cdot 7H_2O$ and picked up and dewatered using Moore leaf-type filters. The filters were submerged in the pick-up tank for 60 minutes until a cake of approximately 1–1½ inches thickness was obtained after which the cake was washed for 30 minutes and then dewatered for 90 minutes. The filter cakes of ~67–70% by weight solids were reslurried using 0.5% 2-amino-2-methyl-1-propanol which provided a finished slurry of 67% solids having a pH of 9.6 and Brookfield viscosity of 150 cps. This slurry gave optics in a low PVC latex paint essentially equal to a dry finished pigment (Table I).

Example 4

Fines were end treated with the hydrous oxides of titanium and aluminum, (yielding 0.5% $TiO_2$ and 2.0% $Al_2O_3$ on a $TiO_2$ weight basis), given a coating of pentaerythritol, dewatered, dried and double fluid-energy milled. The resultant samples were evaluated in the gloss latex paint formulation and compared to a pigment control containing the same hydrous oxide treatment produced in the plant. The data of Table I show the laboratory sample was essentially equal to the control sample produced in the plant.

TABLE I

| | Slurry, percent solids | pH | Viscosity, cps. | | Low PVC latex paint | | | |
| --- | --- | --- | --- | --- | --- | --- | --- | --- |
| | | | Fresh | At 1 wk. | Color | Hiding power | Gloss | Tinting strength |
| Example 1 | | | | | | | | |
| Slurry; | | | | | | | | |
| 102A | *80 | 10.0 | 1,000 | 2,000 | −1 | tr− | tr+ | −1 |
| 108A | 72 | 10.6 | 110 | 360 | +1 | tr+ | tr+ | tr+ |
| 108B | 74 | 10.2 | 120 | 270 | +1 | tr− | tr+ | −1 |
| 109A | 75 | 10.2 | 200 | 260 | −1 | tr− | = | −1 |
| 111A | 70 | 10.4 | 110 | 150 | +2 | tr+ | tr+ | +2 |
| 114A | 74 | 10.3 | 320 | 450 | +2 | tr+ | tr− | tr+ |
| Example 2 | | | | | | | | |
| Slurry 144A | 65 | 10.4 | 150 | 300 | −1 | vsl− | −1 | tr− |
| Example 3 | | | | | | | | |
| Slurry 162B | 67 | 10.0 | 120 | | +1 | vsl+ | −1 | +3 |
| Example 4 (Dry pigment controls—plant and laboratory) | | | | | | | | |
| Sample 497520 | Plant produced | | | | Std. = | Std. = | Std. = | Std. |
| R-7733-200B | Laboratory produced | | | | | | | +1 |

*2 dewatering cycles—balance of samples dewatered once.

The above examples demonstrated that high solids content rutile pigment slurries produced from in-process, untreated grit-free $TiO_2$ slurries of about 20% solid content by weight exhibited optical properties in the low PVC latex paint system equivalent to a finished pigment without the necessity of end-treating, drying and fluid energy milling as for the finished pigment. It is shown that high solids content rutile slurries can be prepared from in-process materials eliminating many of the costly and time-consuming steps in $TiO_2$ finishing. Existing plant equipment can be utilized for slurry preparation eliminating the need for additional equipment. Such slurries facilitate the handling and shipment of rutile $TiO_2$ pigment. These slurries should be particularly attractive to the manufacturers of paper coatings, and water based paints because they can receive and store rutile $TiO_2$ in a predispersed state and then meter out of storage for appropriate applications. It reduces or eliminates the need for high speed dispersion equipment normally used by the manufacturer. It also eliminates bags and bagging operations for the $TiO_2$ producer.

We claim:
1. A process for producing high solids content pigment slurries comprising the steps of flocculating a grit-free anhydrous titanium dioxide pigment slurry of about 20% solids by weight with a flocculating reagent, said flocculat- ing reagents of the class consisting of magnesium sulfate, magnesium chloride, barium chloride, sulfuric acid, hydrochloric acid and acetic acid and present in a range of 0.2–1.0% by weight based on pigment solids, dewatering said flocculated pigment and reslurrying said dewatering pigment by means of a dispersing agent whereby slurry of at least 60% solids content is obtained.

2. The process of claim 1 wherein said dispersant is of the class consisting of 2-amino-2-methyl-1-propanol, triethanolamine, sorbitol and mannitol and present in an amount of from 0.3% to 0.75% by weight based on pigment solids.

3. The process of claim 1 wherein said dewatering is by vacuum and continued until a filter cake of at least 60% solids content is obtained.

4. The process of claim 1 wherein the 20% solids content grit-free slurry is prepared from either calciner or burner discharge which contains aluminum oxide.

References Cited

UNITED STATES PATENTS

| | | | |
|---|---|---|---|
| 2,933,408 | 4/1960 | Dempster et al. | 106—300 |
| 3,536,510 | 10/1970 | Allen et al. | 106—300 |
| 3,556,828 | 1/1971 | Durrant et al. | 106—300 |
| 3,567,479 | 3/1971 | Portes et al. | 106—300 |

FOREIGN PATENTS

| | | | |
|---|---|---|---|
| 780,512 | 3/1968 | Canada | 106—300 |

JAMES E. POER, Primary Examiner

UNITED STATES PATENT OFFICE
CERTIFICATE OF CORRECTION

Patent No. 3,758,322    Dated September 11, 1973

Inventor(s) GEORGE LEATHWHITE ROBERTS Jr. & JOHN DAVID ROWLAND

It is certified that error appears in the above-identified patent and that said Letters Patent are hereby corrected as shown below:

Column 4, line 20, the word "pentaenythritol" should read -- pentaerythritol --.

Signed and sealed this 12th day of February 1974.

(SEAL)
Attest:

EDWARD M. FLETCHER, JR.  
Attesting Officer

C. MARSHALL DANN  
Commissioner of Patents